June 25, 1963 — L. E. REED — 3,095,231
COLLAPSIBLE TENT AND TRAILER
Filed Sept. 29, 1961 — 2 Sheets-Sheet 1
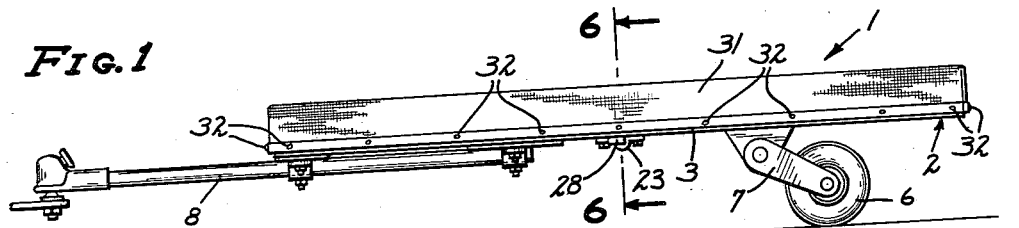
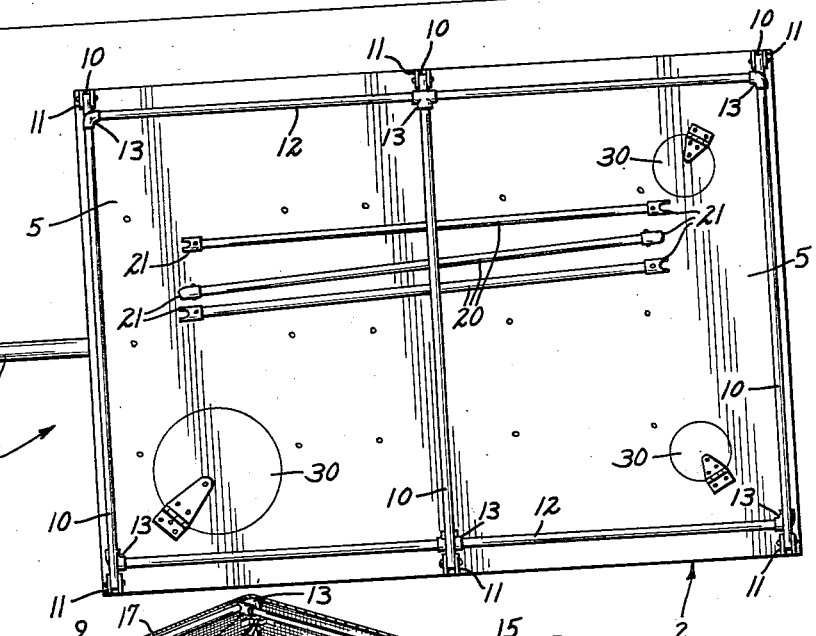
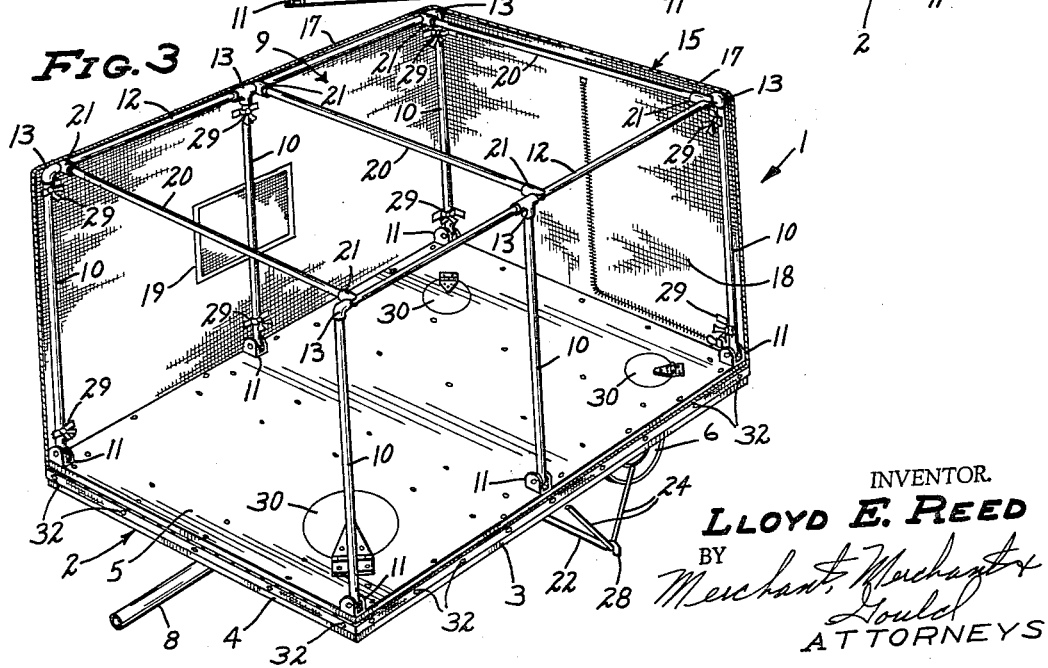
INVENTOR.
LLOYD E. REED
BY Merchant, Merchant & Gould
ATTORNEYS

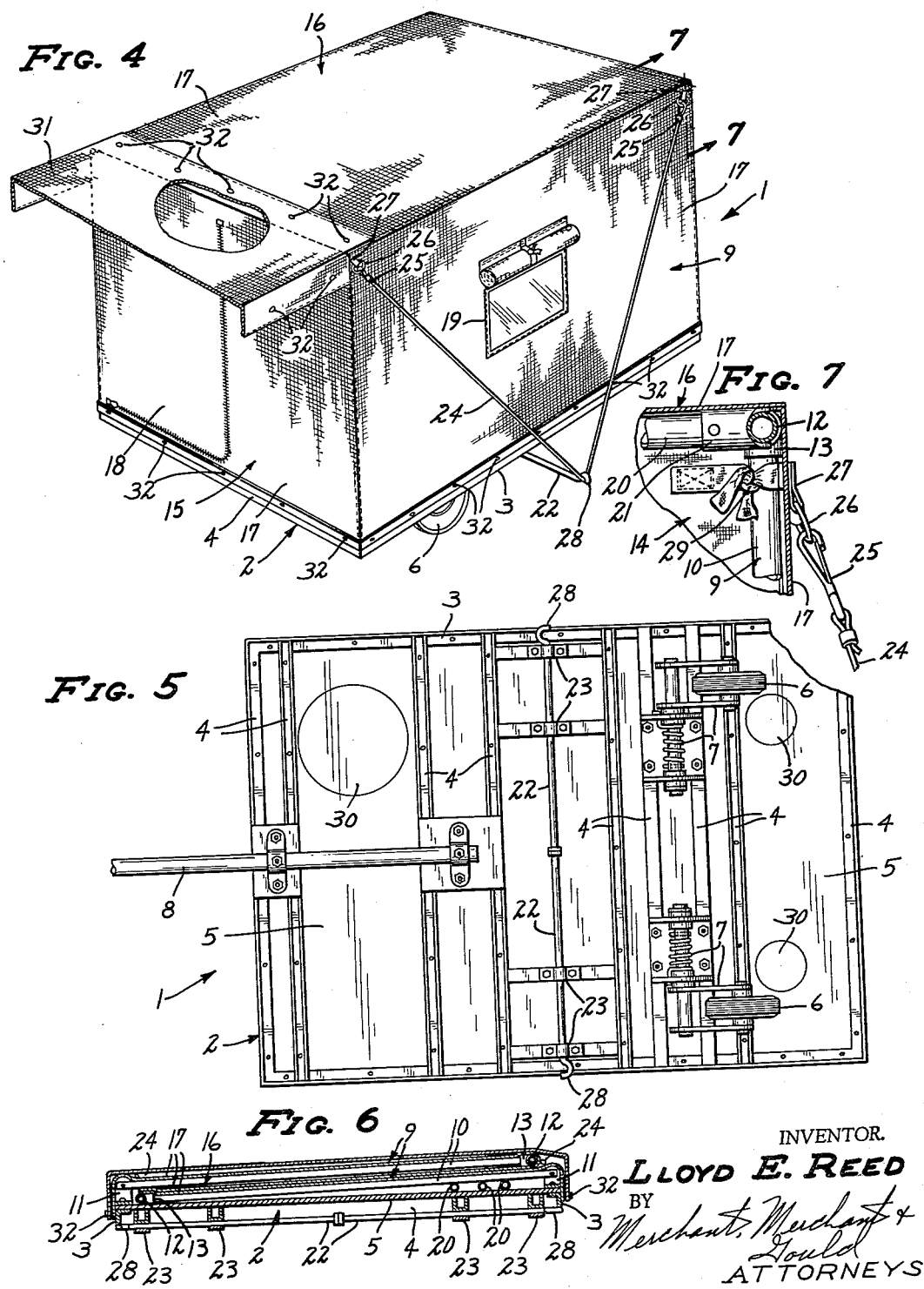

United States Patent Office 3,095,231
Patented June 25, 1963

3,095,231
COLLAPSIBLE TENT AND TRAILER
Lloyd E. Reed, 122 Davis St., Mankato, Minn.
Filed Sept. 29, 1961, Ser. No. 141,785
3 Claims. (Cl. 296—23)

This invention relates generally to trailer vehicles, and more particularly it relates to a multi-purpose collapsible tent and trailer unit.

An object of this invention is the provision of a collapsible tent and trailer unit which may be quickly and easily converted from its erected position to its collapsed or folded position.

Another object of this invention is the provision of a light weight collapsible tent and trailer unit which includes novel retractable means for guying or bracing the tent in its erected position so as to make the structure more rigid and permanent.

Another object of this invention is the provision of a collapsible tent and trailer unit in which said novel guying means may be quickly and easily engaged to support the trailer tent and may also be quickly and easily disassembled or moved to a retracted or non-protruding position.

Other objects of this invention reside in the provision of a collapsible tent and trailer unit which is light in weight, but durable and simple in construction, and highly efficient in providing satisfactory performance of its objects and purposes.

The above and still further objects and advantages of this invention will become apparent from the following detailed specification, appended claims and attached drawings.

Referring to the drawings wherein like reference characters indicate like parts or elements throughout the several views:

FIG. 1 is a view in side elevation of my invention in its collapsed or folded position;

FIG. 2 is a view in top plan thereof with some parts removed and with the tongue thereof broken away;

FIG. 3 is a view thereof in perspective as seen generally from the front of the invention, some parts being broken away and some parts shown in section;

FIG. 4 is another view in perspective of this invention, but taken generally from the rear of the invention, some parts being broken away and some parts shown in section;

FIG. 5 is a view in bottom plan thereof, some parts being broken away;

FIG. 6 is a view in section taken on the line 6—6 of FIG. 1; and

FIG. 7 is a view in section taken on the line 7—7 of FIG. 4.

Referring with greater particularity to the drawings, the reference numeral 1 represents the collapsible tent and trailer unit in its entirety. The collapsible tent and trailer unit 1 comprises a rigid rectangular floor structure, represented generally by the reference numeral 2. The floor structure 2 includes rigid longitudinal frame members 3, transverse frame members 4, and a relatively thin flat floor board 5. A pair of transversely spaced wheels 6 are secured by conventional suspension means 7 to the bottom side of the floor structure 2. Also, an elongated tongue 8 is rigidly secured in forwardly projecting relationship to the floor structure 2 so as to adapt the trailer unit 1 for connection to a towing vehicle, not shown.

The tent and trailer unit 1 further comprises spaced foldable rectangular side walls, represented generally by the reference numeral 9. The side walls 9 each includes a plurality of elongated longitudinally spaced frame rods 10, which are hingedly connected at their lower ends in generally co-axial relationship to the upper surface of the floor board 5 by means of the brackets 11. Each of the frame rods 10 is positioned so as to be transversely aligned with a corresponding frame rod 10 of the other side wall 9. The side walls 9 each further comprises a generally horizontally disposed elongated top rod 12 rigidly secured by suitable fittings 15 to the upper ends of each of the frame rods 10. The above described construction of the side walls 9 permits the same to be foldable from spaced upright positions, as shown in FIGS. 3 and 4, to folded positions in overlying generally horizontal relationship to the floor structure 2, as shown in FIGS. 2 and 6.

The tent and trailer unit 1 further comprises a collapsible generally rectangular front wall 14, a rear wall 15 and a top wall 16. The side walls 9, front wall 14, rear wall 15 and top wall 16 are preferably covered with a flexible water-resistant material 17, such as heavy canvas. The rear wall 15 is formed with a zippered flap 18 so as to define an entranceway to the tent 1, and the side walls 9 are provided with windows 19. In order to provide means for supporting the side walls 9 in their above described upright positions, a plurality of elongated generally parallel removable brace rods 20 are one each removably secured adjacent the upper ends of a different one of the transversely aligned pairs of the frame rods 10 of the side walls 9. The opposite ends of each of the brace rods 20 are provided with fork fittings 21 which are adapted to engage the top rods 12 of each side wall 9 when the tent is in its erected position so as to add rigidity and permanence thereto, this being shown particularly in FIG. 3.

As seen in FIGS. 1, 5 and 6, a pair of retractable supporting rods 22 are one each secured adjacent opposite sides of the floor structure 2 beneath the bottom thereof and are mounted thereto by generally U-shaped brackets 23 so as to be slidable laterally between a laterally outwardly projecting extended position, shown in FIGS. 3 and 4, and a retracted position in underlying relationship to the floor structure 2, as shown in FIGS. 5 and 6. For the purpose of adding supporting strength to the tent 1, a flexible guy element 24 is associated with each of the supporting rods 22. The guy element 24 on each side of the trailer 1 is provided with snaps 25 at its opposite ends so as to be removably securable to the rings 26 secured, as at 27, to the upper corners of the side walls 9 of the tent 1. The generally intermediate portion of each of the guy elements 24 is removably secured to the outer hook end 28 of a separate one of the supporting rods 22. The supporting rods 22 and the guy elements 24 are arranged and adapted to prevent the front wall 14, rear wall 15 and top wall 16 of the trailer tent 1 from collapsing when the side walls 9 of the trailer tent 1 are in their above described upright positions.

In accordance with this invention, and as shown in FIGS. 3 and 7, a plurality of ties 29 are secured to the tent material 17 adjacent the frame rods 10 so as to make the tent more stable and also provide anchorage for the guy elements 24. It is noted that the floor board 5 of the floor structure 2 is provided with suitably positioned holes having hingedly connected covers 30 whereby to adapt the structure for fishing through the ice. Also, a canopy curtain 31 is secured by a plurality of snap fasteners 32 to the rear of the trailer tent 1, as shown in FIG. 4.

Having specifically described this invention, the operative simplicity thereof should be easily understandable; however, briefly stated, when it is desired to erect the trailer tent 1 to its upright position, the guy element 24 on one side of the tent 1 is grasped and the side wall 9 is thereby lifted to a generally vertical position, after which the generally intermediate portion of the guy element 24 is hooked to the outer hook end 28 of the adjacent supporting rod 22, the latter of which has previously been moved to its outer position. Then the other side wall 9 is erected to a similar position, and the elongated brace rods 20 are positioned intermediate the top rods 12 of the side walls 9. Of course, when it is desired to collapse the trailer tent 1, the above procedure is merely reversed, and the canopy curtain 31 covers the folded tent, the curtain 31 being secured by a plurality of marginally located snap fasteners 32.

This invention has been thoroughly tested and found to be completely satisfactory for the accomplishment of the above objects and advantages; and while I have shown and described a preferred embodiment thereof, I wish it to be specifically understood that the same may be modified without departure from the scope and spirit of the appended claims.

What I claim is:

1. A collapsible tent and trailer comprising a rigid floor structure having ground engaging wheels and adapted for connection to a towing vehicle; foldable side walls; collapsible front, rear and top walls; a pair of retractable supporting rods one each secured on opposite sides of said floor structure adjacent the bottom thereof and movable between a laterally outwardly projecting extended position and a retracted position in underlying relationship to said floor structure; and a pair of flexible guy elements; said guy elements being one each connected at its upper end to a different one of said side walls adjacent the upper edge thereof and also connected at its lower end to the outer end of said supporting rod; said supporting rods and said guy elements being of such length and further arranged and adapted to prevent said front, rear and top walls of said trailer tent from collapsing.

2. A collapsible tent and trailer comprising a rigid rectangular floor structure having ground engaging wheels and adapted for connection to a towing vehicle; foldable rectangular side walls; said side walls each including a plurality of spaced elongated frame rods hingedly connected at their lower ends to said floor structure adjacent the side edges thereof and being transversely aligned with a corresponding frame rod of the other side wall, said side walls being foldable from spaced upright positions to folded positions in overlying generally horizontal relationship to said floor structure; said trailer tent further comprising collapsible front, rear and top walls; said top wall including a plurality of removable elongated frame rods one each removably secured intermediate the upper ends of a different one of the transversely aligned pairs of said frame rods of said side walls when said side walls are in said upright position; a pair of retractable supporting rods one each secured on opposite sides of said floor structure adjacent the bottom thereof and movable between a laterally outwardly projecting extended position and a retracted position in underlying relationship to said floor structure; and a pair of flexible guy elements, said guy elements being one each connected at its upper end to a different one of said side walls adjacent the upper edge thereof and also connected at its lower end to the outer end of said supporting rod; said supporting rods and said guy elements being of such length and further arranged and adapted to prevent said front, rear and top walls of said trailer tent from collapsing when said side walls are in their said upright position.

3. A collapsible tent and trailer comprising a rigid rectangular floor structure having ground engaging wheels and adapted for connection to a towing vehicle; foldable rectangular side walls; said side walls each including a plurality of spaced elongated frame rods hingedly connected at their lower ends to said floor structure and being transversely aligned with a corresponding frame rod of the other side wall; said side walls being foldable from spaced upright positions to folded positions in overlying generally horizontal relationship to said floor structure; said trailer tent further comprising collapsible rectangular front, rear and top walls; said top wall including a plurality of removable elongated frame rods one each removably secured adjacent the upper ends of a different one of the transversely aligned pairs of said frame rods of said side walls when said side walls are in said upright position; said side, front, rear and top walls being fabricated from a flexible water-resistant material; said rear wall including connecting flaps which define an entranceway; a pair of retractable supporting rods one each secured on opposite sides of said floor structure adjacent the bottom thereof and movable between a laterally outwardly projecting extended position and a retracted position in underlying relationship to said floor structure; and a pair of flexible guy elements associated with each of said supporting rods; said guy elements on each side of said trailer being one each connected at its upper end to the upper end of a different one of the most forwardly disposed one and the most rearwardly disposed one of said elongated frame rods and also connected at its lower end to the outer end of said supporting rod; said supporting rods and said guy elements being of such length and further arranged and adapted to prevent said front, rear and top walls of said trailer tent from collapsing when said side walls thereof are in said upright position.

References Cited in the file of this patent

FOREIGN PATENTS

| | | |
|---|---|---|
| 555,931 | Belgium | Apr. 15, 1957 |
| 1,224,054 | France | Feb. 8, 1960 |